United States Patent
Zhao et al.

(10) Patent No.: US 12,346,942 B2
(45) Date of Patent: Jul. 1, 2025

(54) ASSET-EXCHANGE FEEDBACK IN AN ASSET-EXCHANGE PLATFORM

(71) Applicant: LendingClub Bank, National Association, Lehi, UT (US)

(72) Inventors: Mark Zhao, San Francisco, CA (US); Ashish Dhaka, San Francisco, CA (US); Jingtian Wei, San Francisco, CA (US); Bharanidharan Ganesan, San Francisco, CA (US)

(73) Assignee: LendingClub Bank, National Association, Lehi, UT (US)

( * ) Notice: Subject to any disclaimer, the term of this patent is extended or adjusted under 35 U.S.C. 154(b) by 41 days.

(21) Appl. No.: 17/960,048

(22) Filed: Oct. 4, 2022

(65) Prior Publication Data

US 2024/0112230 A1    Apr. 4, 2024

(51) Int. Cl.
*G06Q 30/0283* (2023.01)
*G06N 20/20* (2019.01)
*G06Q 30/0601* (2023.01)

(52) U.S. Cl.
CPC ......... *G06Q 30/0283* (2013.01); *G06N 20/20* (2019.01); *G06Q 30/0601* (2013.01)

(58) Field of Classification Search
CPC . G06Q 30/0283; G06Q 30/0601; G06N 20/20
(Continued)

(56) References Cited

U.S. PATENT DOCUMENTS 8,190,486 B1 * 5/2012 Ouimet ................. G06Q 30/02
                                                    705/26.1
11,244,340 B1 * 2/2022 Morin ................ G06Q 30/0224
(Continued)

FOREIGN PATENT DOCUMENTS

WO     WO-2023225529 A2 * 11/2023 ............. G06N 5/022

OTHER PUBLICATIONS

Dey Chowdhury, Rishi & Sarkar, Arghya & Banik, Mrinmoy & Bobbili, Prisha. Product Attribute Extraction and Product Listing Analysis from E-commerce Websites. https://www.researchgate.net/publication/371348902_Product_Attribute_Extraction_and_Product_Listing_Analysis_from_E-commerce_Websites (Year: 2023).*

*Primary Examiner* — George Chen
*Assistant Examiner* — Lisa Ma
(74) *Attorney, Agent, or Firm* — Invoke

(57) ABSTRACT

An asset-exchange feedback system is implemented for performing asset-exchange feedback operations. The asset-exchange feedback system collects historical asset-listing data from an asset-exchange platform. The historical asset-listing data comprises, for each asset listing of a plurality of previous asset listings, a plurality of asset-listing attributes and a result of the asset listing. The asset-exchange feedback system uses a first machine learning model to determine, based on the historical asset-listing data, a first set of attribute-importance scores. Each attribute-importance score in the first set of attribute-importance scores corresponds to a respective asset-listing attribute in the plurality of asset-listing attributes and indicates an importance of the respective asset-listing attribute to one or more offerees participating in the asset-exchange platform. The asset-exchange feedback system performs an asset-exchange feedback operation based on the first set of attribute-importance scores.

20 Claims, 9 Drawing Sheets

(58) Field of Classification Search
USPC .......................................................... 705/400
See application file for complete search history.

(56) References Cited

U.S. PATENT DOCUMENTS

| | | | |
|---|---|---|---|
| 2009/0182647 A1* | 7/2009 | Sundaresan | G06Q 30/0601 |
| | | | 705/26.1 |
| 2011/0004509 A1* | 1/2011 | Wu | G06Q 30/0631 |
| | | | 705/26.7 |
| 2011/0055127 A1* | 3/2011 | Umblijs | G06N 5/025 |
| | | | 706/12 |
| 2013/0073410 A1* | 3/2013 | Bhogal | G06Q 30/08 |
| | | | 705/26.3 |
| 2014/0058915 A1* | 2/2014 | Hinesley | G06Q 40/06 |
| | | | 345/440 |
| 2016/0063065 A1* | 3/2016 | Khatri | G06F 16/9535 |
| | | | 707/723 |
| 2016/0291807 A1* | 10/2016 | Chong | G06Q 30/0641 |
| 2017/0039633 A1* | 2/2017 | Yenisetty | G06Q 30/0275 |
| 2018/0349977 A1* | 12/2018 | Codella | G06Q 30/0631 |
| 2019/0236695 A1* | 8/2019 | McKenna | G06F 21/577 |
| 2019/0311301 A1* | 10/2019 | Pyati | G06F 16/901 |
| 2020/0034668 A1* | 1/2020 | Dutta | G06N 20/20 |
| 2020/0104866 A1* | 4/2020 | Lagerling | G06Q 30/0202 |
| 2020/0202421 A1* | 6/2020 | Kneen | G06Q 30/08 |
| 2020/0250556 A1* | 8/2020 | Nourian | G06F 18/24 |
| 2020/0380584 A1* | 12/2020 | Mozzami | G06Q 30/0633 |
| 2021/0406937 A1* | 12/2021 | Oh | G06N 20/20 |

\* cited by examiner

FIG. 5

ATTRIBUTE-IMPORTANCE SCORE RANKING

| ATTRIBUTE | CATEGORY | MAY-22 | JUNE-22 | JULY-22 | JUNE-MAY | JULY-JUNE |
|---|---|---|---|---|---|---|
| Interest Rate | Interest Rate | 25% | 29% | 43% | 4% | 13% |
| PTI | Affordability | 17% | 16% | 14% | -2% | -2% |
| Number of Revolving Trades Opened in Past 24 Months | Credit Hunger | 13% | 13% | 11% | 0% | -1% |
| Maximum Balance Owed on All Bankcard Accounts | Affordability | 7% | 6% | 5% | 0% | -2% |
| Total High Credit Limit | Affordability | 5% | 4% | 5% | 0% | 0% |
| Loan Size | Loan Size | 5% | 5% | 4% | 1% | -2% |
| Months Since Oldest Revolving Account Opened | Credit History | 5% | 5% | 4% | 0% | -1% |
| Months Since Recent Bankcard Account Opened | Credit Hunger | 6% | 4% | 3% | -2% | -1% |
| Months Since Oldest Installment Account Opened | Credit Hunger | 4% | 4% | 3% | 0% | -1% |
| Annual Income | Affordability | 4% | 3% | 3% | -1% | 0% |
| Months Since Most Recent Inquiry | Credit Hunger | 3% | 4% | 2% | 1% | -1% |
| Platform P3 Loan Average Execution Price L30D | Competition | 3% | 4% | 2% | 1% | -2% |
| Platform P3 Loan Average # of Loans L30D | Liquidity | 3% | 3% | 1% | 0% | -2% |

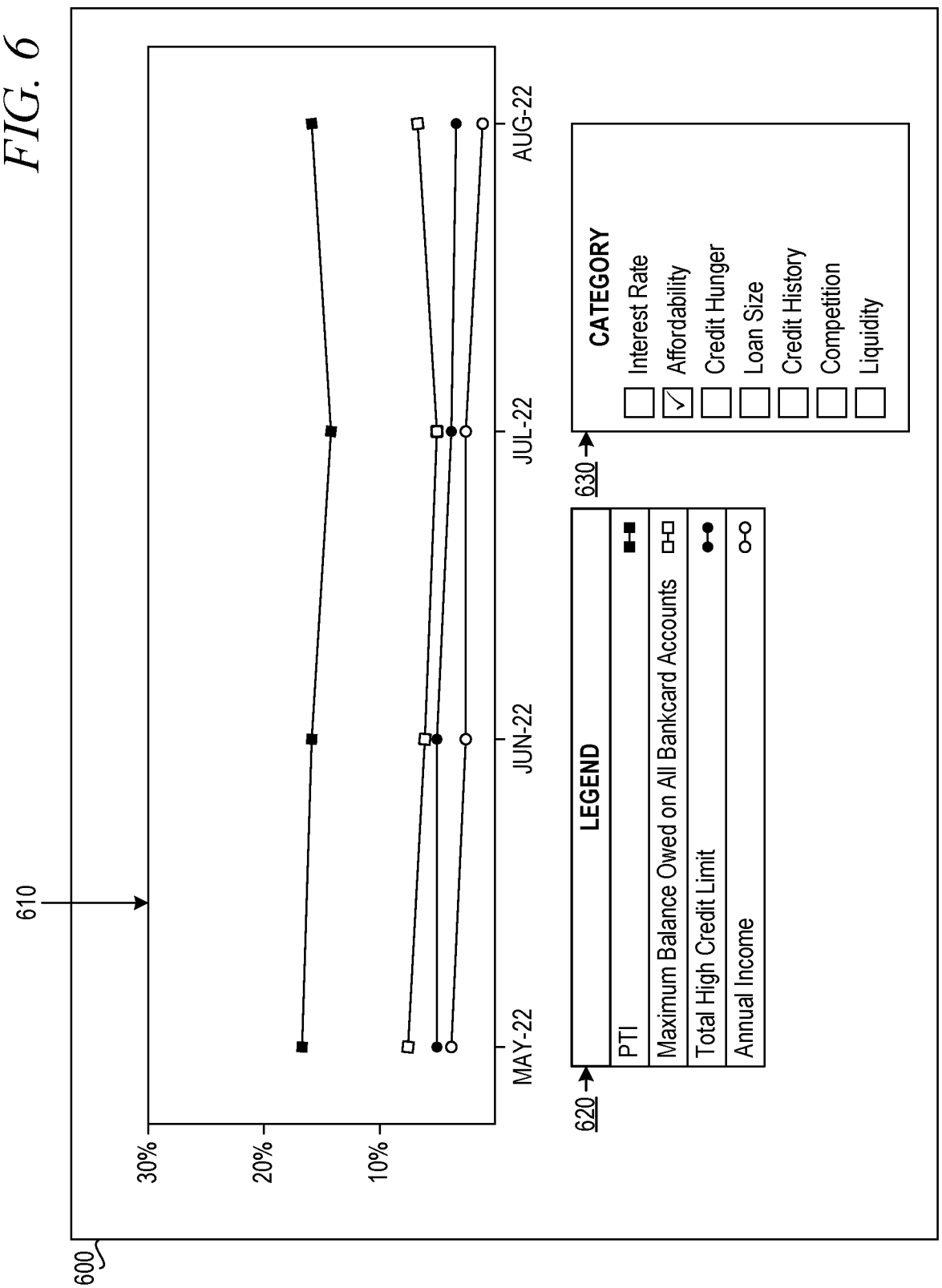

ASSET-EXCHANGE FEEDBACK IN AN ASSET-EXCHANGE PLATFORM

FIELD OF THE INVENTION

The present invention relates to asset-exchange platforms and, more specifically, to using machine learning to improve efficiency of asset-exchange platforms.

BACKGROUND

An asset-exchange platform is any platform in which assets are offered to offerees, and the offerees are able to accept or decline those offers. While asset-exchange platforms have existed throughout all of human history, in recent years is has become common for those platforms to be computerized. Thus, online platforms in which assets are offered have become ubiquitous. The online platforms may take a variety of forms, including online marketplaces and online auction sites.

Unfortunately, most online platforms suffer from the same inefficiencies as in-person marketplaces. Specifically, the inefficiencies emerge when the offeror and the offeree have differing views of what is important. For example, an offeror may attempt to make an offer more appealing by changing a particular term of the offer. However, if the changed term is not a term of particular importance to the offeree, the change will not result in an acceptance. As another example, the offeror may significantly alter many terms to obtain an acceptance in situations where a single change to a single term considered important to the offeree would have been just as successful.

Failure to understand which aspects of an offer are important to the parties that are participating in an asset-exchange platform leads to inefficiencies where (a) one party or the other gives up far more than necessary, (b) no agreement is reached even though the right terms would have been acceptable to both parties, and/or (c) agreement is reached only after multiple unnecessary iterations of negotiation. Clearly it is desirable to provide automated techniques for reducing the inefficiencies experienced by online asset-exchange platforms.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 5 illustrates an example screen of a GUI of the asset-exchange feedback system showing a table representation of importance values for asset-listing attributes in accordance with an illustrative embodiment.

FIG. 6 illustrates an example screen of a GUI of the asset-exchange feedback system showing a graph of importance values over time for asset-listing attributes filtered by category in accordance with an illustrative embodiment.

DETAILED DESCRIPTION

Figure 1:
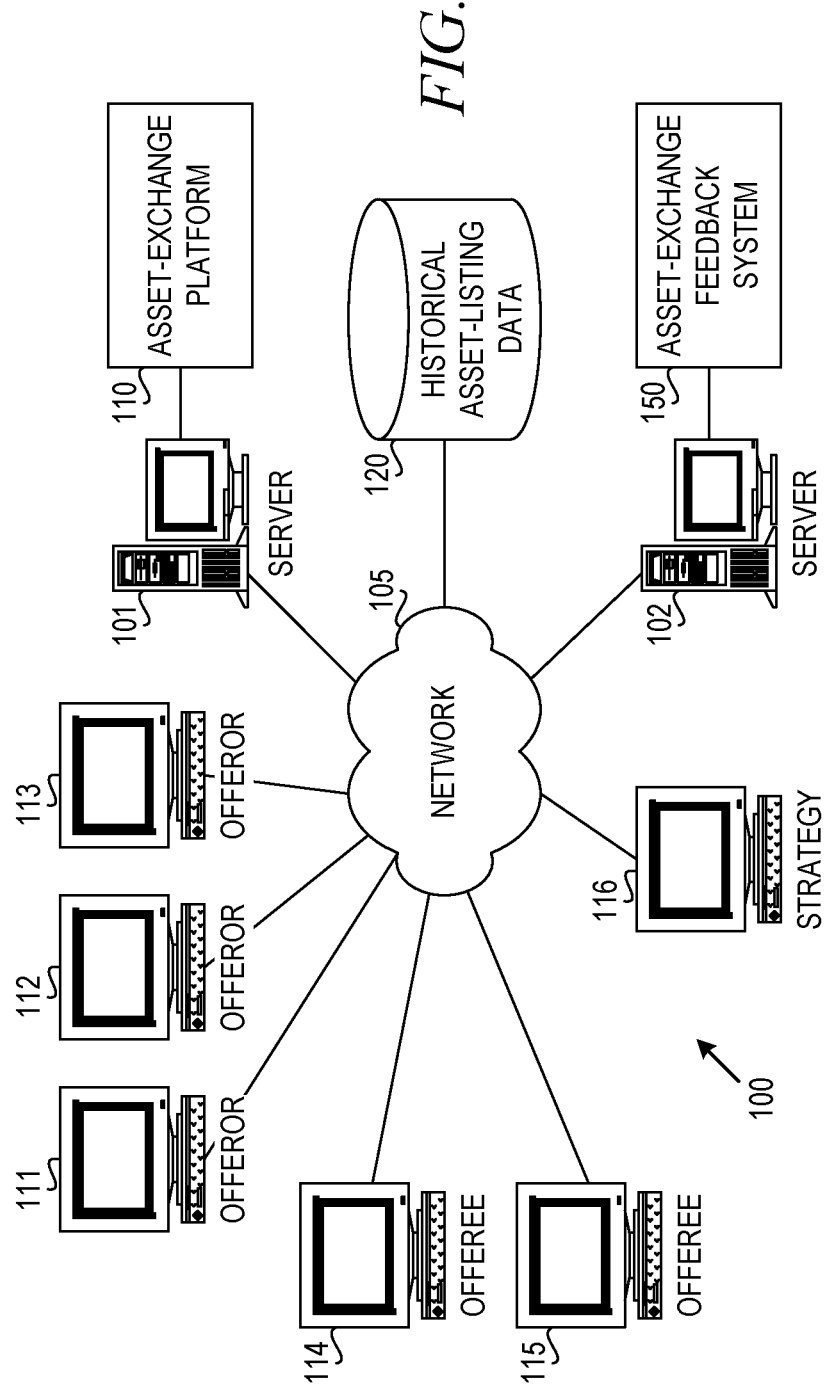
FIG. 1 is a diagram illustrating an example online asset-exchange environment in which an asset-exchange feedback system provides feedback for an asset-exchange platform in accordance with an illustrative embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Modifiers such as "first" and "second" may be used to differentiate elements, but the modifiers do not necessarily indicate any particular order.

General Overview

An asset-exchange platform is a computerized platform for listing assets to be exchanged between offerors and offerees. An asset is any item, service, or contract having a value. In one embodiment, an asset is a loan for which an offeror wishes to borrow money, and an offeree is an investor that funds the loan in exchange for interest. In this embodiment, the loan is a contract between the offeror and the offeree. In another embodiment, an asset is a Request for Quotation (RfQ) in which an offeror presents an invitation for bid (IFB) to solicit suppliers or contractors to submit price quotes and bids for the chance to fulfill the contract. In another embodiment, an asset is a physical item for sale where the offeror presents the item for sale and the offerees bid on the item.

An asset listing is an offer from an offeror to exchange an asset with an offeree. The asset listing includes an asset being offered and a set of asset-listing attributes. The asset-listing attributes describe the asset being offered. For example, an RfQ may have attributes including a name of the product or service required, a quantity of products or a schedule of services, a replenishment schedule for the product or service, payment terms, and special considerations. As another example, a loan may have attributes including a credit score of the offeror, income of the offeror, interest rate, term of the loan, amount of the loan, etc.

In one embodiment, the asset-exchange platform operates an auction to match the offeror to one or more offerees and to determine a price at which the asset-exchange will be executed. Types of auctions include open auctions with ascending price, open auctions with descending price, sealed or first-price auctions, sealed bid second-price auctions, all pay auctions, buyout auctions, and silent auctions. For example, an item of value can be listed on the asset-exchange platform using an auction with ascending price, while a RfQ can be listed using an auction with descending price. An asset listing results in a successful asset-exchange being executed if the asset listing receives at least one bid. An asset listing with zero bids will not be executed. This can happen if the starting price is set to high for an auction with ascending price, for example. Thus, a result of an asset listing can include a number of bids, where the number of bids can be zero for an unsuccessful listing or a positive number for a successful listing. Alternatively, a result of an asset listing can include an asset-exchange being executed between the offeror and an offeree having a winning bid at a price of the winning bid.

Auctions typically have a predetermined time window for offerees to bid on asset listings. This time window allows for bids to increase as the time window closes, with each offeree wishing to be the final bid. However, there are instances where an offeror needs or wants a quick decision on an asset listing. For example, an offeror applying for a loan may need to receive a bid in the same day or even within hours. In this case, it is undesirable to have multiple rounds of bidding. In one embodiment, the asset-exchange platform operates a single-price buyout auction in which an asset is listed at a price and offerees bid on the asset listing if the listing price is acceptable. This will result in the asset listing not resulting in an asset-exchange being executed if the listing price is too high. In this case, the offeror must list the asset at a lower list price and start the process over, which is undesirable to the offeror.

Alternatively, the asset listing can result in an asset-exchange being executed if the price is acceptable to one or more offerees. In one embodiment, a winning bid is selected from among a plurality of bids at the same price based on a selection scheme, such as selecting a first bid, selecting a random bid, using a round-robin approach, or the like. In this example, a high number of bids is an indication that the listing price is too low. Even though the asset listing results in an asset-exchange being executed quickly, the offeror may experience seller's remorse because the listing price could have been higher.

In accordance with an illustrative embodiment, an asset-exchange feedback system is provided for performing asset-exchange feedback operations. In one embodiment, the asset feedback operations are performed to optimize future asset listings on the asset-exchange platform, such that unsuccessful asset listings are avoided, and asset-exchanges are executed in a timely manner. An asset-exchange feedback operation is an operation that provides feedback information to one or more users with insights for improving future asset listings and exchanges or an operation that affect future listings on the asset-exchange platform.

The asset-exchange feedback system collects historical asset-listing data that has been recorded by the asset-exchange platform and uses a suite of machine learning models to generate asset-exchange feedback information. In one embodiment, the historical asset-listing data includes previous asset listings with asset-listing attributes, results of the asset listings, and performance data associated with the previous asset listings. In one embodiment, the historical asset-listing data also includes macroeconomic factors at the time of each asset listing. In another embodiment, the historical asset-listing data includes participation factors at the time of each asset listing. The asset-exchange feedback system trains and uses an attribute-importance machine learning model to determine, based on the historical asset-listing data, attribute-importance scores. Each attribute-importance score corresponds to a respective asset-listing attribute in a plurality of asset-listing attributes and indicates an importance of the respective asset-listing attribute to one or more offerees participating in the asset-exchange platform. The attribute-importance scores provide insight into how to form assets to be attractive to offerees on the asset-exchange platform and how to price asset listings to improve a likelihood of resulting in a successful asset-exchange being executed. In one embodiment, the asset-exchange feedback operation includes causing a display of a representation of the attribute-importance scores to one or more interested parties. For instance, a credit strategy team can enable credit strategy changes to enable loan origination that dovetail more with investor (offeree) preferences.

Macroeconomic factors may include, for example, a number of reported unemployment claims or unemployment rate, federal funds rate, inflation rate, or pandemic disease data, such as a number of reported cases, hospitalization rate, etc. Participation factors may include, for example, competition factors, liquidity factors, or momentum factors. Competition factors may include, for example, an average number of participants in the asset-exchange platform over a period of time or an average number of bids submitted via the asset-exchange platform over a period of time. Liquidity factors may include, for example, average number of executed asset-exchanges over a period of time, listing volume over a period of time, average execution time over a period of time, or a percentage of swept asset listings that receive no bids. Momentum factors may include, for example, average listing price and execution price over a period of time, listing price versus execution price dynamics over a period of time, execution price volatility over a period of time, or percentage of listings priced at a premium versus listings priced at par versus listings priced at a discount over a period of time. Thus, as macroeconomic factors and participation factors change over time, the asset-exchange feedback system can demonstrate how asset-listing importance scores change.

In another embodiment, the result of the asset listing comprises a price at which the asset listing was executed. The asset-exchange feedback system trains and uses the attribute-importance machine learning model to determine, based on the historical asset-listing data and the set of asset-listing attributes, a predicted price for a new asset listing. In this embodiment, the asset-exchange feedback operation includes submitting the new asset listing to the asset-exchange platform with the set of asset-listing attributes and the predicted price. Thus, as asset-listing importance scores change over time, the asset-exchange feedback system can predict a price at which a new asset listing will result in a successful asset-exchange being executed based on the asset-listing attributes of the new asset listing.

In one embodiment, the asset-exchange feedback system trains and uses a classification machine learning model to categorize a new asset listing, based on the historical asset-listing data and the set of asset-listing attributes, into a first category indicating that the new asset listing is predicted to be executed at a discount price, a second category indicating that the new asset listing is predicted to be executed at a premium price, or a third category indicating that the new asset listing is predicted to be executed at par (neither premium nor discount). In this embodiment, the asset-exchange feedback operation includes submitting the new asset listing to the asset-exchange platform with the set of asset-listing attributes and at a listing price according to results of the classification machine learning model.

In another embodiment, the result of the asset listing comprises a number of bids on the asset listing by the one or more offerees through the asset-exchange platform. The asset-exchange feedback system trains and uses a predictive machine learning model to predict, based on the historical asset-listing data and the set of asset-listing attributes, a number of bids from the one or more offerees through the asset-exchange platform. The bid number prediction provides insight into whether an asset listing is priced too high, if the predicted number of bids is zero, or the asset listing is priced too low, if the predicted number of bids is greater than a predetermined threshold. In other words, knowing a predicted number of bids helps in pricing the asset listing on the asset-exchange platform.

In another embodiment, the historical asset-listing data includes, for each asset listing of the plurality of previous asset listings, performance data of the asset listing. The asset-exchange feedback system trains and uses the attribute-importance machine learning model to determine, based on the historical asset-listing data, a second set of attribute-importance scores, each attribute-importance score corresponding to a respective asset-listing attribute in the plurality of asset-listing attributes and indicating an importance of the respective asset-listing attribute to performance of the asset listing. In this example, the asset-exchange feedback operation includes causing display of a comparison of the set of attribute-importance scores indicting importance of the asset-listing attributes to one or more offerees participating in the asset-exchange platform and the second set of attribute-importance scores indicating importance of the asset-listing attributes to performance of asset listings.

In an embodiment, the asset-exchange feedback system trains and uses the attribute-importance machine learning model to determine a plurality of sets of attribute-importance scores based on historical asset-listing data at multiple points of time. In this embodiment, the asset-exchange feedback operation includes causing display of a representation of change over time of the attribute-importance scores corresponding to the plurality of asset-listing attributes.

Asset-Exchange Platform Example: Loan Origination

One example of an asset-exchange platform is a platform in which "loans" are offered to "investors". In context, the loans are the assets offered by "borrowers" and the investors are offerees to whom the loans are offered under specific terms. The techniques described herein may be used to increase the likelihood that the offered terms have increased likelihood of acceptance, thereby minimizing the number of iterations of term changes in order for a given loan to receive funding. While examples of the techniques used herein shall be given in the context of a loan funding platform, the techniques are not limited to any particular context and may be equally applicable to increase the efficiency of any asset-exchange platform.

With respect to the context of a loan funding platform, "loan origination" is a process by which a borrower applies for a new loan, and a lender processes the application. Origination generally includes all the steps from taking a loan application up to disbursal of funds or declining the application. Thus, loan origination includes listing the loan, executing an agreement between the borrower and the lender, and disbursal of funds. Loan servicing covers everything after disbursing the funds until the loan is fully paid off. Traditionally, loan origination platforms use manual processes to sell loans using spreadsheets traded between parties to negotiate prices and volumes.

The loan origination process involves the borrower, the lender, and often a broker. An asset-exchange platform may serve as an online broker that lists pre-issuance originated loans along with their attributes, which investors (lenders) can instantly purchase in accordance with their loan-selecting strategies. Prior to listing a loan on the asset-exchange platform, a credit strategy team assesses the risk of a loan, determines how much a borrower can borrow, and constructs the loan application by selecting one or more loan attributes, such as term and interest rate.

There is no way to measure investors' risk appetite or strategies using traditional processes other than talking to them directly or by making informed guesses based on personal experience. Even when using an asset-exchange platform, there is a disconnect between the strategies used by the credit strategy team to construct and list a loan application and the strategies used by the investors to select loans for purchase. Therefore, asset-exchange platforms have inherent inefficiencies. Such qualitative inferences of investor risk appetite and loan type preferences can lead to a disconnect in setting the initial listing price vis-à-vis the price an investor is likely to pay for the loan. This can lead to longer execution times and, therefore, longer wait times for borrowers to receive disbursal of funds. Additionally, the types of loans listed on the platform may not match with the investors' preferences, again leading to lower execution prices, longer execution times, or loan expirations. Similar problems exist for other types of asset-exchanges.

Asset-Exchange Platform and Feedback System

FIG. 1 is a diagram illustrating an example online asset-exchange environment in which an asset-exchange feedback system provides feedback for an asset-exchange platform in accordance with an illustrative embodiment. System 100 may include a network of computers in which aspects of the illustrative embodiments may be implemented. The system 100 contains at least one network 105, which is the medium used to provide communication links between various devices and computers connected within system 100. The network 105 may include connections, such as wire, wireless communication links, or fiber optic cables.

Within system 100, server 101 and server 102 are connected to network 105 along with storage unit 120. In addition, clients 111-116 are also connected to network 105. Clients 111-116 can be, for example, personal computers, network computers, or the like. In accordance with the illustrative embodiment, server 101 implements asset-exchange platform 110 and provides access to the asset-exchange platform 110 to clients 111-116. For purposes of illustration only, FIG. 1 depicts the asset-exchange platform 110 being implemented on server 101; however, the asset-exchange platform 110 can be distributed across multiple computing devices, including servers and/or client devices within system 100. Offerors can list assets on the asset-exchange platform 110 via client devices 111-113, and offerees can purchase assets on the asset-exchange platform 110 via client devices 114, 115. Other users can also interact with the asset-exchange platform 110, such as a credit strategy team at client device 116.

Asset-exchange platform 110 stores historical asset-listing data in storage unit 120. In one embodiment, storage unit 120 is a database, and client devices 111-116 and server devices 101, 102 can access the historical asset-listing data via a database management system (DBMS). In one example embodiment, the historical asset-listing data is stored in a relational database in storage unit 120. The historical asset-listing data in storage unit 120 can include asset-listing attributes, results of asset listings, macroeconomic factors, platform participation factors, and asset performance data. The asset-exchange platform 110 can access the historical asset-listing data in storage unit 120 to perform asset-exchange operations.

In accordance with the illustrative embodiment, server 102 implements asset-exchange feedback system 150 and provides access to the asset-exchange feedback system 150 to clients 111-116. For purposes of illustration only, FIG. 1 depicts the asset-exchange feedback system 150 being implemented on server 102; however, the asset-exchange feedback system 150 can be distributed across multiple computing devices, including servers and/or client devices within system 100. In one embodiment, asset-exchange feedback system 150 is integrated within the asset-exchange platform 110 and implemented on the same server device 101 or distributed across multiple computing devices. The asset-exchange feedback system 150 collects historical asset-listing data from storage unit 120 and uses a suite of trained machine learning models to provide insights and to perform asset-exchange feedback operations to assist offerors, offerees, and the credit strategy team to plan, list, and execute future asset listings on the asset-exchange platform 110.

Figure 2:
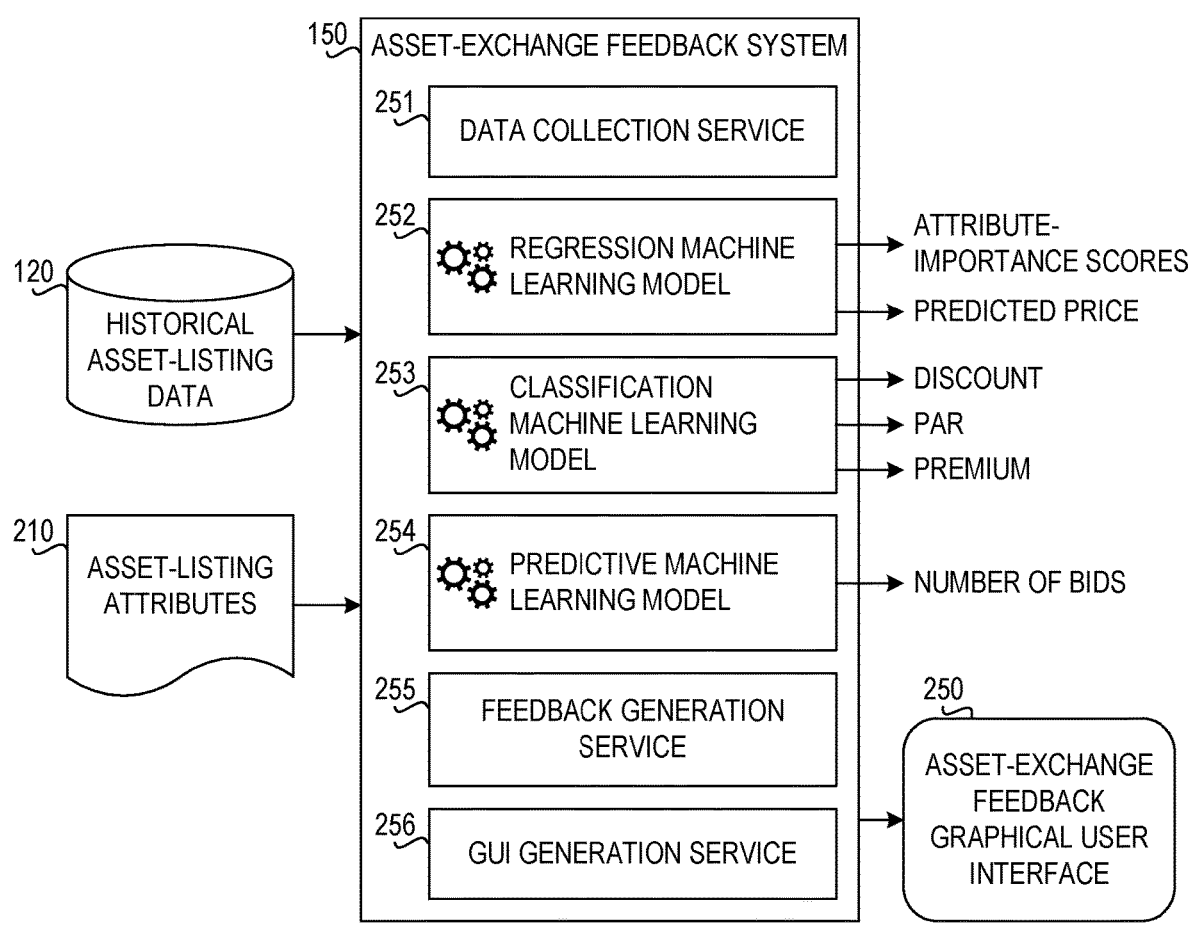
FIG. 2 is a diagram illustrating example functional components of an asset-exchange feedback system in accordance with an illustrative embodiment.

FIG. 2 is a diagram illustrating example functional components of an asset-exchange feedback system in accordance with an illustrative embodiment. Asset-exchange feedback system 150 comprises data collection service 251, regression machine learning model 252, classification machine learning model 253, predictive machine learning model 254, feedback generation service 255, and graphical user interface (GUI) generation service 256. In an embodiment, the data collection service 251 collects historical asset listing data from storage unit 120 to service as training data for training the regression machine learning model 252, the classification machine learning model 253, and the predictive machine learning model 254. The asset-exchange feedback system 150 can use different sets of training data to train the machine learning models 252-254 to provide different outputs or to perform different asset-exchange feedback operations. In this manner, the asset-exchange feedback system uses the suite of machine learning models 252-254 to provide a comprehensive set of insights.

The regression machine learning model 252 can use any regression machine learning algorithm, such as linear regression, ridge regression, neural network regression, least absolute shrinkage and selection operator (LASSO) regression, decision tree regression, random forest, K nearest neighbors (KNN) model, support vector machine (SVM), Gaussian regression, or polynomial regression. In one embodiment, the regression machine learning model 252 uses random forest, or random decision forest, which is an ensemble learning method for classification, regression, and other tasks that operate by constructing a multitude of decision trees at training time. The classification machine learning model 253 can use supervised learning, unsupervised learning, or reinforcement learning algorithms. The classification machine learning model 253 can use any classification machine learning algorithm, such as logistic regression, decision tree, random forest, SVM, KNN, or naïve Bayes. In one embodiment, the classification machine learning model 253 uses random forest. The predictive machine learning model 254 can use any predictive machine learning model, such as linear regression, logistic regression, neural network, decision trees, random forest, or naïve Bayes.

In one embodiment, the data collection service 251 collects historical asset-listing data from storage unit 120 including, for previous asset listings, a plurality of asset-listing attributes and a result of each previous asset listing. The asset-exchange feedback system 150 trains the regression machine learning model 252 to determine a first set of attribute-importance scores. Each attribute-importance score corresponds to a respective asset-listing attribute and indicates an importance of the respective asset-listing attribute to one or more offerees participating in the asset-exchange platform. The random forest algorithm has a built-in feature importance computation. Thus, the regression machine learning model 252 receives as input the historical asset-listing data and provides as output the first set of attribute-importance scores. In one example embodiment, each attribute-importance score is a value between 0 and 1 or a percentage, such that a sum of the attribute-importance scores in the first set of attribute-importance scores is 1 or 100%. The regression machine learning model 252 learns from the historical asset-listing data which asset-listing attributes lead to offerees bidding on asset listings. The first set of attribute-importance scores provides insight into the preferences of offerees when purchasing assets via the asset-exchange platform.

In another embodiment, the data collection service 251 also collects historical asset-listing data from storage unit 120 including asset performance data. In the case of financial assets (e.g., loans, mutual funds, cryptocurrency, etc.), contracts (e.g., Requests for Quotations (RfQs)), or other tangible or non-tangible assets, performance data describes how the asset performs. The asset-exchange feedback system 150 trains the regression machine learning model 252 to determine a second set of attribute-importance scores. Each attribute-importance score corresponds to a respective asset-listing attribute and indicates an importance of the respective asset-listing attribute to how well the asset performs. That is, the regression machine learning model 252 receives as input the historical asset-listing data and provides as output the second set of attribute-importance scores. In one example embodiment, each attribute-importance score is a value between 0 and 1 or a percentage, such that a sum of the attribute-importance scores in the second set of attribute-importance scores is 1 or 100%. The regression machine learning model 252 learns from the historical asset-listing data which asset-listing attributes correspond to assets that perform well. The second set of attribute-importance scores, as compared to the first set of attribute-importance scores, provides insight into the effectiveness of the strategies used by offerees when selecting assets for purchase. That is, a comparison of the first set of attribute-importance scores and the second set of attribute-importance scores can highlight discrepancies between the purchasing strategies of offerees and actual performance of assets. Furthermore, this comparison can reveal preferences, or even unconscious biases, of offerees that may be detrimental to success.

In another embodiment, the data collection service 251 collects historical asset-listing data from storage unit 120 including price data indicating a price at which each successful asset listing was executed. The asset-exchange feedback system 150 trains the regression machine learning model 252 to predict a price for a given asset listing. The regression machine learning model 252 learns from the historical asset-listing data the prices that correspond to combinations of asset-listing attributes. The asset-exchange feedback system 150 then receives asset-listing attributes 210 for a new asset listing and applies the trained regression machine learning model 252 to the asset-listing attributes 210. That is, the regression machine learning model 252 receives as input the historical asset-listing data and the asset-listing attributes 210 for a new asset listing and provides as output predicted price. The asset-exchange feedback system 150 can then perform an asset-exchange feedback operation by causing the new asset listing to be listed on the asset-exchange platform 110 based on the predicted listing price.

As described above, the regression machine learning model 252 is trained and used to produce three different outputs: a first set of attribute-importance scores indicating an importance of the asset-listing attributes to offerees when making purchases, a second set of attribute-importance scores indicating an importance of the asset-listing attributes to asset performance, and a predicted price. Alternatively, the asset-exchange feedback system 150 can use any combination of machine learning models to provide the same outputs. In one example embodiment, the asset-exchange feedback system can use a random forest model to determine the first set of attribute-importance scores and the second set of attribute-importance scores and can use a neural network to predict listing price for a new asset listing. In another example embodiment, the asset-exchange feedback system 150 can use three different instances of the same machine learning model that are configured and tuned for their specific tasks.

In one embodiment, the data collection service 251 collects historical asset-listing data from storage unit 120 including result data indicating a price at which each successful asset listing was executed, particularly whether the asset was purchased at a discount, at par, or at a premium. The asset-exchange feedback system 150 trains the classification machine learning model 253 to classify asset listings as discount, par, or premium. The classification machine learning model 253 learns from the historical asset-listing data which combinations of asset-listing attributes correspond to asset listings purchased at a discount, at par, or at a premium. The asset-exchange feedback system 150 then receives asset-listing attributes 210 for a new asset listing and applies the trained classification machine learning model 253 to the asset-listing attributes 210. That is, the classification machine learning model 253 receives as input the historical asset-listing data and the asset-listing attributes 210 for a new asset listing and provides as output three classification outputs: a probability that the new asset listing will be purchased at a discount, a probability that the new asset listing will be purchased at par, and a probability that the new asset listing will be purchased at a premium. The asset-exchange feedback system 150 can then perform an asset-exchange feedback operation by causing the new asset listing to be listed on the asset-exchange platform 110 based on the resulting classification.

In a further embodiment, the data collection service 251 collects historical asset-listing data from storage unit 120 including a price at which each asset was purchased and result data indicating a number of bids for each previous asset listing. The asset-exchange feedback system 150 trains the predictive machine learning model 254 to predict a number of bids for a given asset listing and a given listing price. The predictive machine learning model 254 learns from the historical asset-listing data the number of bids that correspond to combinations of asset-listing attributes and prices at which each asset was purchased. The asset-exchange feedback system 150 then receives asset-listing attributes 210 for a new asset listing and applies the trained predictive machine learning model 254 to the asset-listing attributes 210 and a selected listing price. That is, the predictive machine learning model 254 receives as input the historical asset-listing data, the asset-listing attributes 210 for a new asset listing, and a selected listing price and provides as output a predicted number of bids that the new asset listing will receive from offerees. The asset-exchange feedback system 150 can then perform an asset-exchange feedback operation by causing the new asset listing to be listed on the asset-exchange platform 110 based on the predicted number of bids.

In one example embodiment, the predicted number of bids can be fed back into the suite of machine learning models 252, 253 to correct for any bias given to previous asset listings that resulted in a high number of bids. In other words, the regression machine learning model 252 and the classification machine learning model 253 can give lower weights or confidence scores to previous asset listings that were priced too low and, thus, resulted in a high number of bids.

The feedback generation service 255 compiles outputs from the machine learning models 252-254 to provide to various users of the asset-exchange platform 110. For example, the feedback generation service 255 can generate feedback to educate users on the credit strategy team about which asset-listing attributes are important to offerees. More specifically, the feedback generation service 255 can sort asset-listing attributes from most important to least important. As another example, the feedback generation service 255 can generate feedback to provide to an offeror concerning a new asset listing, including a listing of the asset-listing attributes that are important to offerees, a predicted price for the new asset listing, a predicted number of bids, and a classification of the new listing as discount, par, or premium. For instance, the feedback generation service 255 can calculate a suggested listing price based on the predicted price and the predicted number of bids, the calculation adjusting the price to increment the predicted price if the predicted number of bids is above a first predetermined threshold (e.g., two) or to decrement the predicted price if the predicted number of bids is less than a second predetermined threshold (e.g., one). As a further example, the feedback generation service 255 can generate feedback to educate offerees about discrepancies between the asset-listing attributes that offerees consider important and the asset-listing attributes that result in positive asset performance.

The GUI generation service 256 generates GUI components for presenting the asset-exchange feedback to the various users of the asset-exchange platform 110. For example, the GUI generation service 256 generates dashboard panels to present text, numerical values, tables, and charts. In one embodiment, text can include reasons to explain a predicted listing price or a classification of a new listing as discount or premium. For example, the text can provide asset-listing attributes having high attribute-importance scores to explain why a new listing is classified as being purchased at a discount. The highly ranked asset-listing attributes may include macroeconomic factors or platform participation factors.

The GUI generation service 256 generates asset-exchange feedback graphical user interface (GUI) 250, and the asset-exchange feedback system 150 causes the asset-exchange feedback GUI 250 to be displayed to users. In one embodiment, the asset-exchange feedback GUI 250 is presented to users via a web server and a web browser application executing on a client device. Alternatively, the asset-exchange feedback GUI 250 can be presented via an application executing on a client device that interfaces with the asset-exchange feedback system 150 via an application programming interface (API).

Targeted Feedback for Classes of Offerees

In some embodiments, offerees can be clustered into groups of offerees having similar preferences, risk appetite, and/or platform participation. In one embodiment, the asset-exchange feedback system 150 can train classification machine learning model 253 to classify offerees into categories. In one example embodiment, the asset-exchange feedback system 150 uses unsupervised machine learning, such as k-means clustering, to cluster offerees into groups or categories. The asset-exchange feedback system 150 can then generate feedback that is targeted to categories of offerees. In one embodiment, the asset-exchange feedback system 150 can generate feedback for individual offerees.

Mitigating Bias

In one embodiment, machine learning models employ techniques to mitigate bias. When building machine learning models, it is important to ensure that the data that is used to train the machine learning models is not only clean and accurate, but also, in the case of supervised learning, well-labeled and free of inherently biased data that can skew results. Bias may be a human problem, but the amplification of bias is a technical problem. Machine learning model bias can include data collection bias, data cleaning bias, feature engineering bias, data split bias, model training bias, and model test bias. For example, sampling bias results from mistakes made when collecting data. Sampling bias happens when data is collected in a manner that oversamples from one community and under-samples from another. Experimenter or observer bias occurs when gathering data. An experimenter or observer might only record certain instances of data and skip others that could be beneficial for the learner. Measurement bias is the result of not accurately recording the data that has been selected. For example, if using salary as a measurement, there might be differences in salary including bonus or other incentives or regional differences in the data. Prejudicial bias occurs when data might become tainted by human activities that under-select certain communities and over-select others. Algorithm bias refers to certain parameters of an algorithm that causes it to create unfair or subjective outcomes.

Techniques for mitigating bias include pre-processing techniques, in-processing techniques, and post-processing techniques. Pre-processing bias mitigation starts with training data, which is used in the first phase of development and can introduce underlying bias. Negative outcomes can arise with a lack of diversity within the teams responsible for implementing the technology during the training data stage. Pre-processing techniques can include anonymizing the training data, for example.

In-process bias mitigation offers opportunities for increasing fairness and reducing bias when training the machine learning models. Adversarial debiasing is a classifier model that learns to maximize prediction accuracy and simultaneously reduce and adversary's ability to determine the protected attributes from the predictions. This technique leads to a fair classifier since the predictions are not discriminatory among group members. Prejudice removing is a technique for adding a discrimination-aware regularization term to the learning objective.

Post-processing bias mitigation becomes useful after the model is trained. An equalizing odds technique solves a linear program to optimize equalized odds by changing output labels base don likelihood probability. A calibrated equalized odds technique calculates the probabilities with which to change output labels with an equalized odds objective using over calibrated classifier outputs. A classifying reject options technique is used for giving favorable outcomes to unprivileged (biased) groups and unfavorable outcomes to privileged groups (unbiased) in a confidence band around the decision boundary with the highest uncertainty.

Other bias mitigation techniques can be used within the spirit and scope of the illustrative embodiments. For example, mitigation techniques may include identifying potential sources of bias, setting guidelines or rules for eliminating bias and procedures, identifying accurate representative data, documenting and sharing how data is selected and cleansed, evaluating model performance and selecting model configurations for least bias as well as best performance, and monitoring and reviewing models in operation.

Loan Origination

In one illustrative embodiment, an asset listing is a loan application from a borrower (offeror) to be funded by a lender or investor (offeree). The asset-listing attributes for a loan can include, for example, loan size, interest rate (coupon), annual income, payment-to-income (PTI) ratio, debt-to-income (DTI) ratio, credit score, number of revolving trades opened in a predetermined period of time (e.g., last 24 months), maximum balance owed on all bankcard accounts, months since oldest revolving account opened, months since oldest installment account opened, months since most recent bankcard account opened, total high credit limit, months since most recent inquiry, etc.

In this embodiment, a loan is listed on the asset-exchange platform at a listing price that is different from the loan size. For example, if a borrower wishes to borrow $10,000, the loan can be listed at par (e.g., 100), at a premium (e.g., 102), or at a discount (e.g., 98). In the case of a loan priced at par, an investor would disburse 100% of the loan size to the borrower. However, an investor might favor less risky loans for which the borrower is very likely to pay back the full loan amount and all interest, and the investor might be willing to pay a premium price for such loans. Thus, in the case of a loan priced at a premium, e.g., a loan price of 102, an investor would disburse 102% of the loan size, and the borrower would only have to pay back the loan size plus interest. In the above example, the borrower would receive a funds disbursement of $10,000, with the additional $200 going to the broker, and would have to pay back $10,000 with interest. On the other hand, an investor might be willing to purchase more risky loans at a discount. In the case of a loan priced at a discount, e.g., a loan price of 98, an investor would disburse 98% of the loan size, the broker would make up the $200 shortfall, and the borrower would still receive $10,000 and have to pay back the loan size plus interest. The asset-exchange platform provides the capability of listing loans having different asset-listing attributes at various prices to make the loans more attractive to investors.

In one illustrative embodiment, a loan is listed on the asset-exchange platform at a single listing price, and investors bid to purchase the loan at the listing price. Thus, if one or more investors bid on the loan, then a bid will be selected, and an asset-exchange will be executed between the borrower and the investor that submitted the selected bid. In one embodiment, the asset-exchange platform selects the first bid or a random bid. Alternatively, the asset-exchange can use other selection techniques, such as round-robin. If a listing receives zero bids, then the listing does not result in an asset-exchange being executed. This results in multiple listings for the same loan and delays the borrower receiving disbursement of funds.

Figure 3:
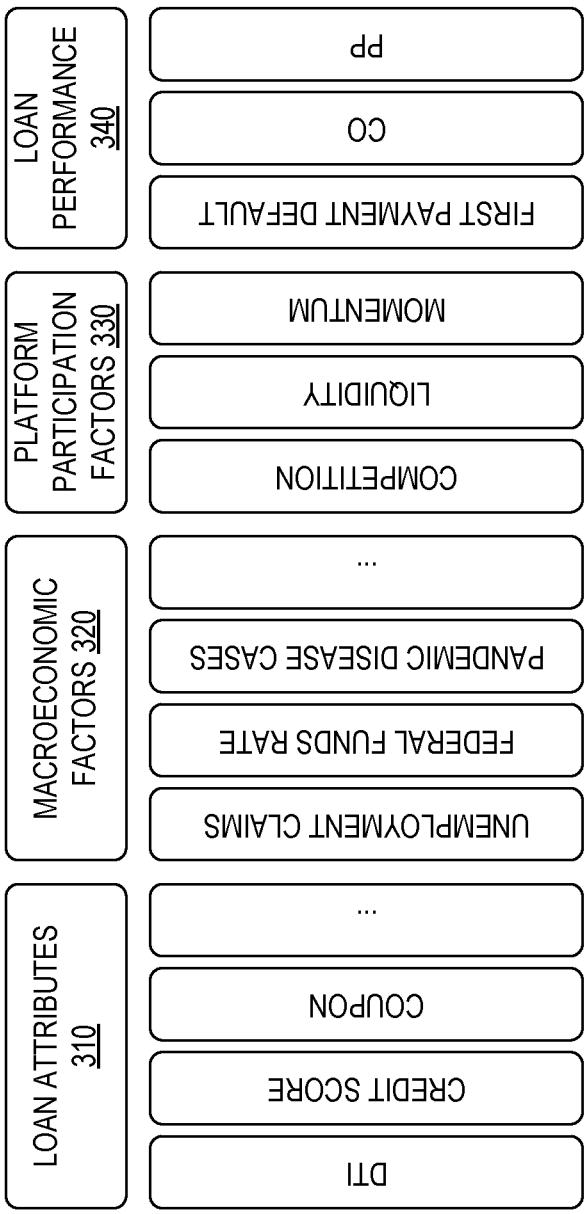
FIG. 3 illustrates example asset-listing attributes included in machine learning models for providing asset-exchange feedback in accordance with an illustrative embodiment.

FIG. 3 illustrates example asset-listing attributes included in machine learning models for providing asset-exchange feedback in accordance with an illustrative embodiment. The asset-listing attributes included in the machine learning models 300 include loan attributes 310, macroeconomic factors 320, platform participation factors 330, and loan performance data 340. The loan attributes 310 include attributes describing the borrower (e.g., income, credit score) and attributes describing the structure of the loan (e.g., loan amount, interest rate). The loan attributes 310 can also be divided into categories, such as interest rate, affordability, credit hunger, loan size, etc.

The macroeconomic factors 320 include attributes that describe fiscal, natural, or geopolitical events or statistics that affect a regional, national, or global economy. Examples of macroeconomic factors 320 can include reported unemployment claims, federal funds rate, inflation rate, number of reported pandemic disease cases, etc. The platform participation factors 330 include competition factors, liquidity factors, and momentum factors. Competition factors may include, for example, an average number of participants in the asset-exchange platform over a period of time or an average number of bids submitted via the asset-exchange platform over a period of time. Liquidity factors may include, for example, average number of executed asset-exchanges over a period of time, listing volume over a period of time, average execution time over a period of time, or a percentage of swept asset listings that receive no bids. Momentum factors may include, for example, average listing price and execution price over a period of time, listing price versus execution price dynamics over a period of time, execution price volatility over a period of time, percentage of listings priced at a premium versus listings priced at par versus listings priced at a discount over a period of time, etc.

Investor strategies change over time depending on macroeconomic factors 320 and platform participation factors 330. The risk appetite and preferences of investors may depend heavily on macroeconomic factors 320. For example, inflation can affect the ability of borrowers to make loan payments on time. Furthermore, platform participation factors 330 can affect investor behavior on the asset-exchange platform. For example, increased competition can increase risk appetite among some investors. Thus, the asset-exchange feedback system 150 can train the machine learning models 252-254 to consider the macroeconomic factors 320 and the platform participation factors 330. The asset-exchange feedback system 150 can provide current macroeconomic factors 320 and current platform participation factors as inputs into the regression machine learning model 252 at distinct points in time to generate sets of attribute-importance scores. The asset-exchange feedback system 150 can then generate feedback that demonstrates how the attribute-importance scores change over time as macroeconomic factors and platform participation factors change.

Figure 4:
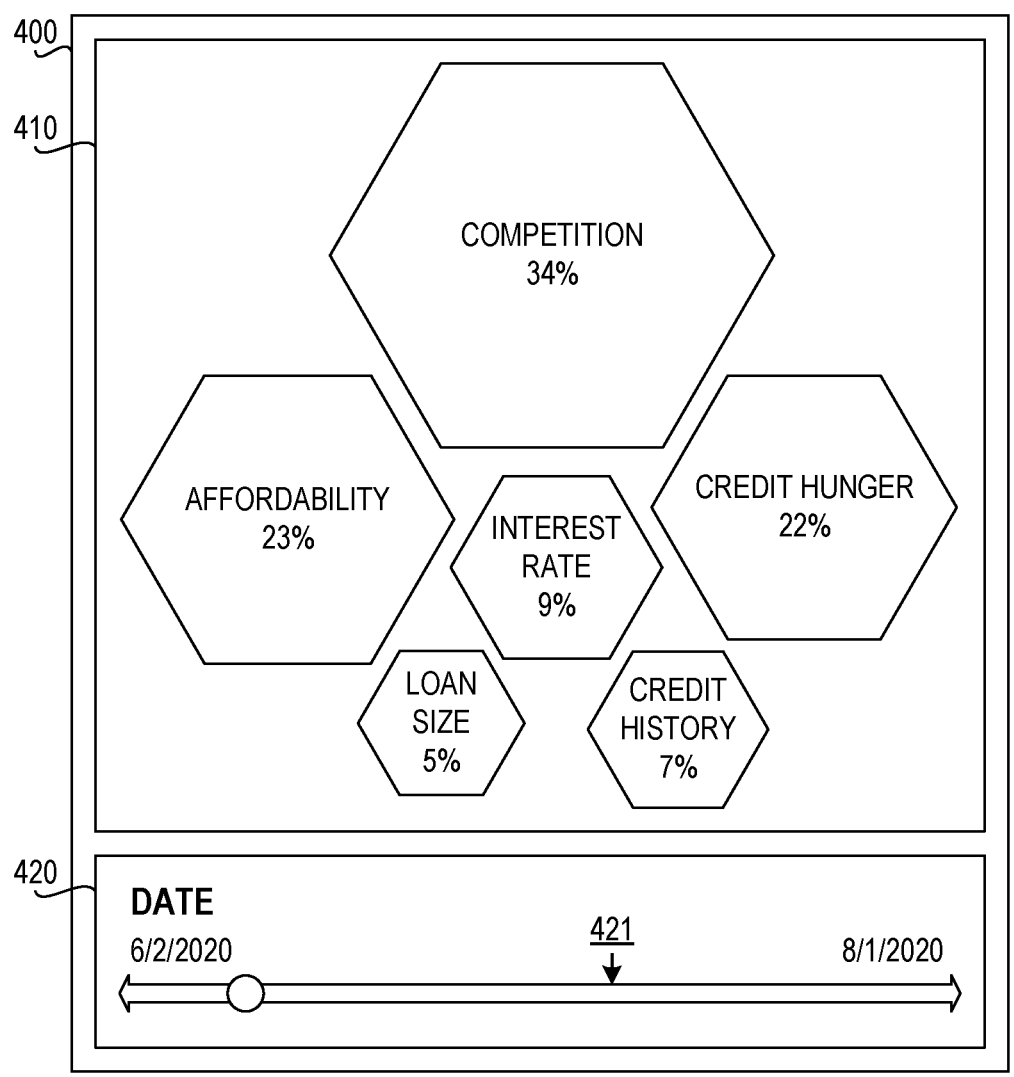
FIG. 4 illustrates an example screen of a graphical user interface (GUI) of the asset-exchange feedback system showing a bubble chart of importance values for categories of asset-listing attributes in accordance with an illustrative embodiment.

FIG. 4 illustrates an example screen of a graphical user interface (GUI) of the asset-exchange feedback system showing a bubble chart of importance values for categories of asset-listing attributes in accordance with an illustrative embodiment. Asset-exchange feedback GUI 400 includes a first panel 410 showing a bubble chart of categories of asset-listing attributes and a second panel 420 showing a time selection control 421. The first panel 410 shows categories including competition, affordability, credit hunger, interest rate, credit history, and loan size presented in a bubble chart where a size of each bubble represents how much importance the category has relative to the other categories. Thus, the asset-listing attributes in the "competition" category have a total importance score of 0.34 or 34%, which is the largest score represented by the largest bubble in the bubble chart. On the other hand, the asset-listing attributes in the "loan size" category have a total importance score of 0.05 or 5%, which is the smallest score represented by the smallest bubble in the bubble chart.

The second panel presents a time selection control 421 for controlling which set of attribute-importance scores is presented in the bubble chart in the first panel 410. Thus, in response to a user interacting with the time selection control 421, the bubbles in the bubble chart in the first panel 410 change in size to show how attribute-importance scores change over time.

FIG. 5 illustrates an example screen of a GUI of the asset-exchange feedback system showing a table representation of importance values for asset-listing attributes in accordance with an illustrative embodiment. The attribute-importance score ranking table 500 lists asset-listing attributes in a first column and the categories of the asset-listing attributes in a second column. The attribute-importance score ranking table 500 shows the respective attribute-importance score for a first date (MAY-22) in a third column, a second date (JUNE-22) in a fourth column, and a third date (JULY-22) in a fifth column. In the depicted example, the asset-listing attributes are sorted or ranked according to the attribute-importance scores in the fifth column. A sixth column shows a difference between the attribute-importance score in the fourth column and the attribute-importance score in the third column. A seventh column shows a difference between the attribute-importance score in the fifth column and the attribute-importance score in the fourth column. Thus, the attribute-importance score ranking table 500 presents attribute-importance scores for a plurality of asset-listing attributes at various points in time and shows how much the attribute-importance scores change over time.

FIG. 6 illustrates an example screen of a GUI of the asset-exchange feedback system showing a graph of importance values over time for asset-listing attributes filtered by category in accordance with an illustrative embodiment. Asset-exchange feedback GUI 600 presents an attribute-importance score graph 610, a legend 620, and a category selection control 630. The attribute-importance score graph 610 graphs attribute-importance score versus time for a subset of asset-listing attributes. A user can filter the asset-listing attributes represented in the attribute-importance score graph 610 by selecting one or more categories in the category selection control 630. In one embodiment, the category selection control 630 includes a checkbox for each asset-listing attribute category. In the depicted example, the user selects the "Affordability" category, and the attribute-importance score graph 610 shows only asset-listing attributes in the selected category. Legend 620 shows a correspondence between the representations in the attribute-importance score graph 610 and the asset-listing attributes being presented. Thus, the user can isolate the asset-listing attributes by category to determine how categories of asset-listing attributes change over time. Alternatively, the user can select all categories in category selection control and see all asset-listing attributes represented in the attribute-importance score graph 610.

The example screens of the asset-exchange feedback GUI shown in FIGS. 4-6 represent a loan origination embodiment; however, the aspects of the embodiments and the GUI components shown in FIGS. 4-6 apply to other types of assets.

Procedural Overview

Aspects of the illustrative embodiments are described herein with reference to flowchart illustrations. It will be understood that each block of the flowchart illustrations, and combinations of blocks in the flowchart illustrations, can be implemented by computer readable program instructions. The flowchart illustrations in the figures illustrate the architecture, functionality, and operation of possible implementations of the illustrative embodiments. In this regard, each block in the flowchart illustrations may represent a module, segment, or portion of instructions that comprises one or more executable instructions for implementing the specified logical functions. In some alternative implementations, the functions noted in the block may occur out of the order noted in the figures. For example, two blocks shown in succession may be executed substantially concurrently, or the blocks may sometimes be executed in the reverse order, depending on the functionality involved. It will also be noted that each block of the flowchart illustrations, and combinations of blocks in the flowchart illustrations, can be implemented by special-purpose hardware-based systems that perform the specified functions or acts or carry out combinations of special-purpose hardware and computer instructions.

Figure 7:
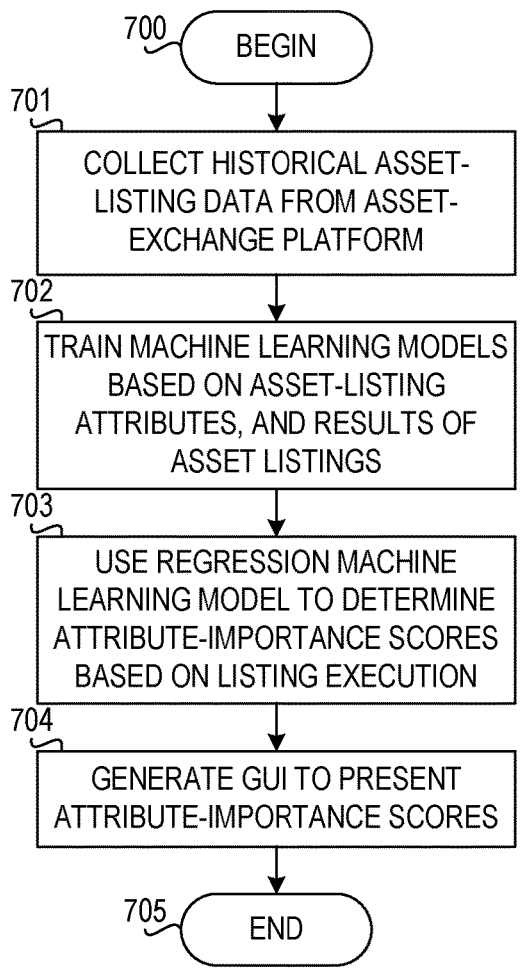
FIG. 7 is a flowchart illustrating operation of an asset-exchange feedback system to generate and present attribute-importance scores for an asset-exchange platform in accordance with an illustrative embodiment.

FIG. 7 is a flowchart illustrating operation of an asset-exchange feedback system to generate and present attribute-importance scores for an asset-exchange platform in accordance with an illustrative embodiment. Operation begins (block 700), and the asset-exchange feedback system collects historical asset-listing data from the asset-exchange platform (block 701). The historical asset-listing data may include, for each asset listing of a plurality of previous asset listings, a plurality of asset-listing attributes and a result of the asset listing. In the illustrative embodiment, the asset-listing attributes include attributes that describe the asset being offered. The result of each asset listing includes whether the asset listing was successful in receiving at least one bid, a price at which the asset was purchased, and a number of bids the asset listing received from offerees. In one embodiment, the historical asset-listing data also includes macroeconomic factors at the time of each asset listing. In another embodiment, the historical asset-listing data includes participation factors at the time of each asset listing.

The asset-exchange feedback system trains machine learning models based on the asset-listing attributes and results of the asset listings (block 702). The asset-exchange feedback system then uses the regression machine learning model to determine attribute-importance scores based on listing execution (block 703). That is, one of the trained machine learning models is a regression machine learning model that has the capability to calculate feature importance scores for the asset-listing attributes. The asset-exchange feedback system applies the trained regression machine learning model to determine a first set of attribute-importance scores. Each attribute-importance score in the first set of attribute-importance scores corresponds to a respective asset-listing attribute in the plurality of asset-listing attributes and indicates an importance of the respective asset-listing attribute to one or more offerees participating in the asset-exchange platform.

The asset-exchange feedback system generates a graphical user interface (GUI) to present the first set of attribute-importance scores (block 704). Thereafter, operation ends (block 705). The asset-exchange feedback system can cause display of the GUI to various users. In one embodiment, the GUI ranks the asset-listing attributes according to the respective attribute-importance scores in descending order. In another embodiment, the GUI shows how the attribute-importance scores change over time.

Figure 8:
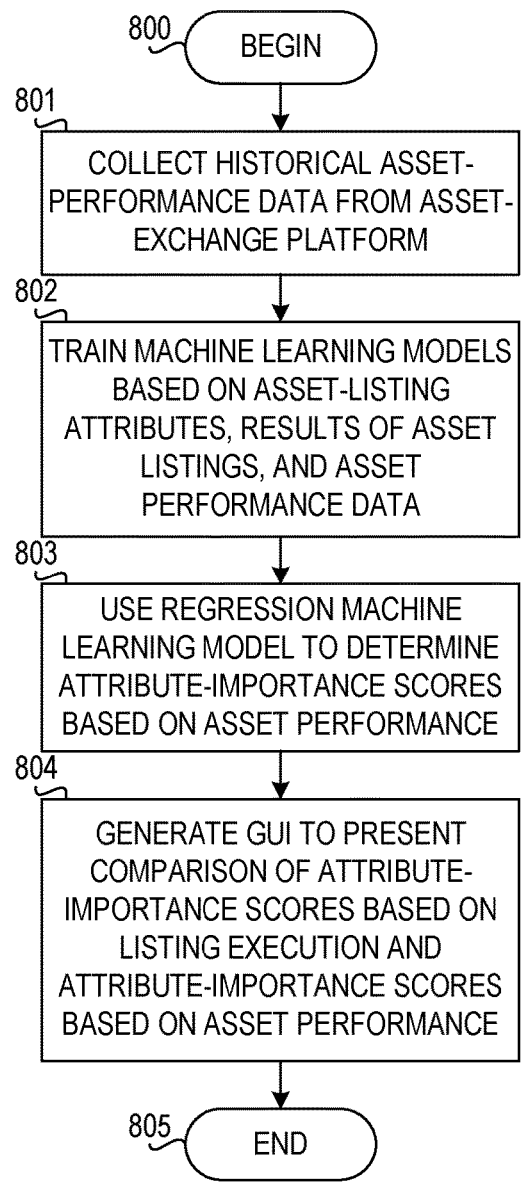
FIG. 8 is a flowchart illustrating operation of an asset-exchange feedback system to generate and present a comparison of attribute-importance scores based on listing execution and attribute-importance scores based on asset performance in accordance with an illustrative embodiment.

FIG. 8 is a flowchart illustrating operation of an asset-exchange feedback system to generate and present a comparison of attribute-importance scores based on listing execution and attribute-importance scores based on asset performance in accordance with an illustrative embodiment. Operation begins (block 800), and the asset-exchange feedback system collects historical asset-performance data from the asset-exchange platform (block 801). The asset-exchange feedback system trains the machine learning models based on the asset-listing attributes, results of asset listings, and asset performance data (block 802). The asset-exchange feedback system then uses the regression machine learning model to determine attribute-importance scores based on asset performance (block 803). That is, one of the trained machine learning models is a regression machine learning model that has the capability to calculate feature importance scores for the asset-listing attributes. The asset-exchange feedback system applies the trained regression machine learning model to determine a second set of attribute-importance scores. Each attribute-importance score in the second set of attribute-importance scores corresponds to a respective asset-listing attribute in the plurality of asset-listing attributes and indicates an importance of the respective asset-listing attribute to performance of the asset listing.

The asset-exchange feedback system generates a graphical user interface (GUI) to present a comparison of the first set of attribute-importance scores based on listing execution and the second set of attribute-importance scores based on asset performance (block 804). Thereafter, operation ends (block 805). The asset-exchange feedback system can cause display of the GUI to various users. In one embodiment, the asset-exchange feedback system causes display of the GUI to one or more offerees to provide insights about which asset-listing attributes offerees prefer versus which asset-listing attributes correspond to assets that perform well.

Figure 9:
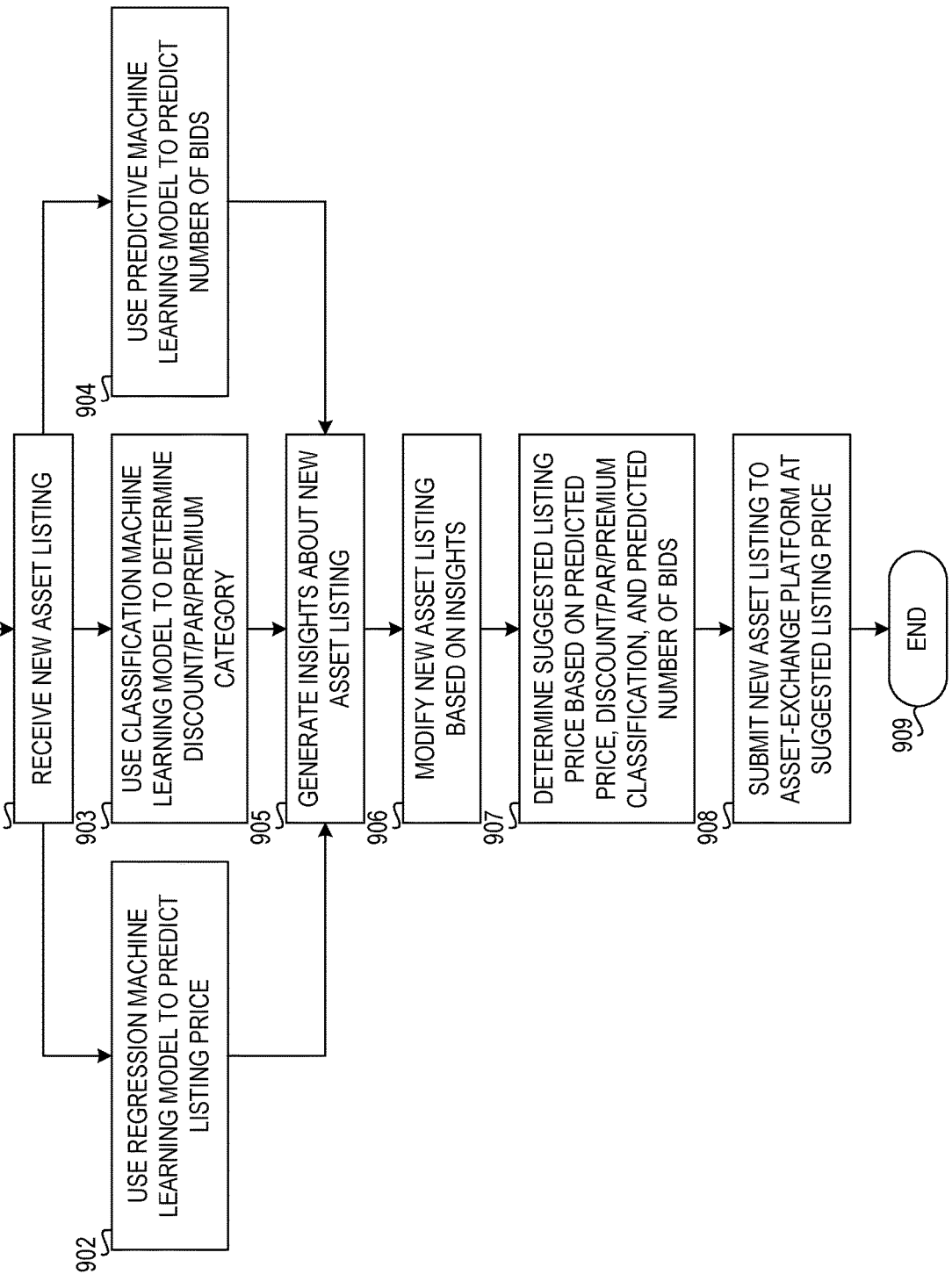
FIG. 9 is a flowchart illustrating operation of an asset-exchange feedback system to perform asset-exchange feedback operations for a new asset listing in accordance with an illustrative embodiment.

FIG. 9 is a flowchart illustrating operation of an asset-exchange feedback system to perform asset-exchange feedback operations for a new asset listing in accordance with an illustrative embodiment. Operation begins (block 900), and the asset-exchange feedback system receives a new asset listing having a set of asset-listing attributes (block 901). In response to receiving the new listing, the asset-exchange feedback system uses the regression machine learning model to predict a listing price for the new asset (block 902), uses a classification machine learning model to determine a discount, par, or premium category (block 903), and uses a predictive machine learning model to predict a number of bids for the new listing at a given listing price (block 904).

The predicted listing price from block 902 indicates a price at which the new asset listing is likely to receive at least one bid from offerees. The discount/par/premium classification from block 903 indicates a likelihood that the new asset is to be purchased at a discounted price, a likelihood that the new listing is to be purchased at par, and a likelihood that the new listing is to be purchased at a premium price. The number of bids from block 904 indicates whether the new listing will receive zero bids, resulting in an unsuccessful listing, which is an indication that the price is too high, or will receive more than a predetermined number of bids, which is an indication that the price is too low.

The asset-exchange feedback system then generates insights about the new asset listing (block 905). In one embodiment, these insights provide feedback to the credit strategy team or the offeror to assist in constructing the new asset listing. The asset-exchange feedback system modifies the asset listing based on the insights (block 906). In one embodiment, the asset-exchange feedback system performs the modification in response to changes communicated by the credit strategy team or by the offeror. The asset-exchange feedback system can modify the new asset listing by altering one or more of the asset-listing attributes, such as loan size or interest rate, for example.

The asset-exchange feedback system determines a suggested listing price based on the predicted price, the discount/par/premium classification, and the predicted number of bids (block 907). The asset-exchange feedback system can use a formula or set of rules for calculating the suggested listing price using the predicted price from block 902, the discount/par/premium classification from block 903, and the predicted number of bids from block 904. In one embodiment, the listing price used to predict the number of bids can be the predicted price from block 902, and the asset-exchange feedback system can increment or decrement the predicted price based on the predicted number of bids. That is, the asset-exchange feedback system can decrement the predicted price if the predicted number of bids is below a first predetermined threshold (e.g., one) and increment the predicted price if the predicted number of bids is greater than a second predetermined threshold (e.g., two).

The asset-exchange feedback system then submits the new listing (as modified in block 906 and at the suggested listing price determined in block 907) to the asset-exchange platform (block 908). Thereafter, operation ends (block 909).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
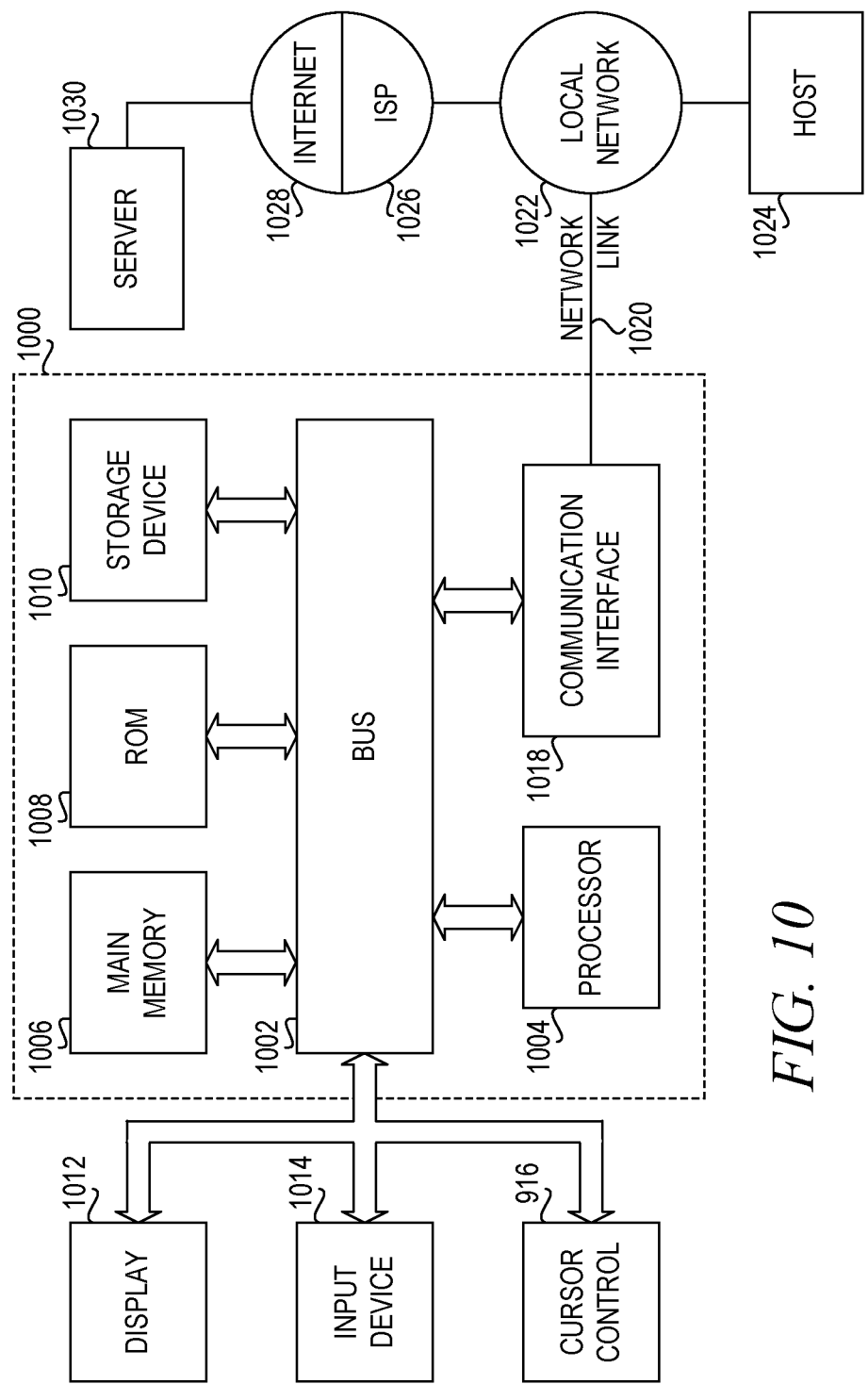
FIG. 10 is a block diagram that illustrates a computer system upon which embodiments of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general-purpose microprocessor.

Computer system 1000 also includes a main memory 1006, such as a random-access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, in a data processing system comprising one or more processors and one or more memories, the one or more memories comprising instructions executed by the one or more processors to cause the one or more processors to implement an asset-exchange feedback system for performing asset-exchange feedback operations, the method comprising:

collecting historical asset-listing data from an asset-exchange platform, the historical asset-listing data comprising, for each asset listing of a plurality of previous asset listings, a plurality of asset-listing attributes and a result of the asset listing;

using the collected historical asset-listing data, training a first machine learning model to output attribute-importance scores, wherein each attribute-importance score:
corresponds to a respective asset-listing attribute in the plurality of asset-listing attributes, and indicates an importance of the respective asset-listing attribute to one or more offerees participating in the asset-exchange platform;

training a second machine learning model to categorize asset listings into one or more predefined categories based on the historical asset-listing data and a set of asset-listing attributes;

training a third machine learning model to predict asset-listing outcomes based on the historical asset-listing data and the set of asset-listing attributes;

after training the first machine learning model:
  using the first machine learning model to output, based on a set of input attributes, a first set of attribute-importance scores, wherein each attribute-importance score in the first set of attribute-importance scores indicates an importance of the respective asset-listing attribute to a specified group of one or more offerees; and
  combining outputs of the first machine learning model, the second machine learning model, and the third machine learning model to generate feedback for optimizing the set of input attributes;
  based on the first set of attribute-importance scores and the feedback generated from the combined outputs of the first, second, and third machine learning models, performing an asset-exchange feedback operation.

2. The method of claim 1, wherein the asset-exchange feedback operation comprises causing display of a representation of the first set of attribute-importance scores.

3. The method of claim 1, wherein the historical asset-listing data further comprises, for each asset listing of the plurality of previous asset listings, a plurality of macroeconomic factors at a time of the asset listing.

4. The method of claim 3, wherein the plurality of macroeconomic factors comprises at least one of number of reported unemployment claims, federal funds rate, inflation rate, or number of reported pandemic disease cases.

5. The method of claim 1, wherein the historical asset-listing data further comprises, for each asset listing of the plurality of previous asset listings, a plurality of participation factors at a time of the asset listing.

6. The method of claim 5, wherein the plurality of participation factors comprises one or more of competition factors, liquidity factors, or momentum factors.

7. The method of claim 1, wherein the asset-exchange feedback operation comprises determining at least one asset-listing attribute for a new asset listing to be offered in the asset-exchange platform.

8. The method of claim 1, further comprising:
  using the first machine learning model to determine a plurality of sets of attribute-importance scores based on historical asset-listing data at multiple points of time,
  wherein the asset-exchange feedback operation comprises causing display of a representation of change over time of the attribute-importance scores corresponding to the plurality of asset-listing attributes.

9. The method of claim 1, wherein the set of input attributes includes at least one of:
  one or more loan attributes,
  one or more platform participation factors, or
  one or more macroeconomic factors.

10. A method, in a data processing system comprising one or more processors and one or more memories, the one or more memories comprising instructions executed by the one or more processors to cause the one or more processors to implement an asset-exchange feedback system for performing asset-exchange feedback operations, the method comprising:
  collecting historical asset-listing data from an asset-exchange platform, the historical asset-listing data comprising, for each asset listing of a plurality of previous asset listings, a plurality of asset-listing attributes and a result of the asset listing;
  using the collected historical asset-listing data, training a first machine learning model to output attribute-importance scores, wherein each attribute-importance score:
    corresponds to a respective asset-listing attribute in the plurality of asset-listing attributes, and
    indicates an importance of the respective asset-listing attribute to one or more offerees participating in the asset-exchange platform;
  after training the first machine learning model:
    using the first machine learning model to output, based on a set of input attributes, a first set of attribute-importance scores, wherein each attribute-importance score in the first set of attribute-importance scores indicates an importance of the respective asset-listing attribute to a specified group of one or more offerees; and
  based on the first set of attribute-importance scores that were output by the first machine learning model, performing an asset-exchange feedback operation;
  wherein the result of the asset listing comprises a price at which the asset listing was executed;
  receiving a new asset listing having a set of asset-listing attributes; and
  using the first machine learning model to determine, based on the historical asset-listing data and the set of asset-listing attributes, a predicted price for the new asset listing,
  wherein the asset-exchange feedback operation comprises submitting the new asset listing to the asset-exchange platform with the set of asset-listing attributes and the predicted price.

11. The method of claim 10, wherein the first machine learning model is a random forest regression model.

12. A method, in a data processing system comprising one or more processors and one or more memories, the one or more memories comprising instructions executed by the one or more processors to cause the one or more processors to implement an asset-exchange feedback system for performing asset-exchange feedback operations, the method comprising:
  collecting historical asset-listing data from an asset-exchange platform, the historical asset-listing data comprising, for each asset listing of a plurality of previous asset listings, a plurality of asset-listing attributes and a result of the asset listing;
  using the collected historical asset-listing data, training a first machine learning model to output attribute-importance scores, wherein each attribute-importance score:
    corresponds to a respective asset-listing attribute in the plurality of asset-listing attributes, and
    indicates an importance of the respective asset-listing attribute to one or more offerees participating in the asset-exchange platform;
  after training the first machine learning model:
    using the first machine learning model to output, based on a set of input attributes, a first set of attribute-importance scores, wherein each attribute-importance score in the first set of attribute-importance scores indicates an importance of the respective asset-listing attribute to a specified group of one or more offerees; and based on the first set of attribute-importance scores that were output by the first machine learning model, performing an asset-exchange feedback operation;

receiving a new asset listing having a set of asset-listing attributes; and using a second machine learning model to categorize the new asset listing, based on the historical asset-listing data and the set of asset-listing attributes, into a first category indicating that the new asset listing is predicted to be executed at a discount price or a second category indicating that the new asset listing is predicted to be executed at a premium price, wherein the asset-exchange feedback operation comprises submitting the new asset listing to the asset-exchange platform with the set of asset-listing attributes and at a listing price according to results of the second machine learning model.

13. The method of claim 12, wherein the second machine learning model is a random forest classification model.

14. The method of claim 12, wherein the result of the asset listing comprises a number of bids on the asset listing by the one or more offerees through the asset-exchange platform, the method further comprising:

receiving a new asset listing having a set of asset-listing attributes; and using a third machine learning model to predict, based on the historical asset-listing data, the set of asset-listing attributes, and a selected listing price, a number of bids from the one or more offerees through the asset-exchange platform.

15. A method, in a data processing system comprising one or more processors and one or more memories, the one or more memories comprising instructions executed by the one or more processors to cause the one or more processors to implement an asset-exchange feedback system for performing asset-exchange feedback operations, the method comprising:

collecting historical asset-listing data from an asset-exchange platform, the historical asset-listing data comprising, for each asset listing of a plurality of previous asset listings, a plurality of asset-listing attributes and a result of the asset listing;

using the collected historical asset-listing data, training a first machine learning model to output attribute-importance scores, wherein each attribute-importance score:
corresponds to a respective asset-listing attribute in the plurality of asset-listing attributes, and
indicates an importance of the respective asset-listing attribute to one or more offerees participating in the asset-exchange platform;

after training the first machine learning model:
using the first machine learning model to output, based on a set of input attributes, a first set of attribute-importance scores, wherein each attribute-importance score in the first set of attribute-importance scores indicates an importance of the respective asset-listing attribute to a specified group of one or more offerees; and based on the first set of attribute-importance scores that were output by the first machine learning model, performing an asset-exchange feedback operation;

wherein the historical asset-listing data further comprises, for each asset listing of the plurality of previous asset listings, performance data of the asset listing;

using the first machine learning model to determine, based on the historical asset-listing data, a second set of attribute-importance scores, wherein each attribute-importance score in the second set of attribute-importance scores:
corresponds to a respective asset-listing attribute in the plurality of asset-listing attributes, and
indicates an importance of the respective asset-listing attribute to performance of the asset listing, wherein the asset-exchange feedback operation comprises causing display of a comparison of the first set of attribute-importance scores indicating importance of the asset-listing attributes to one or more offerees participating in the asset-exchange platform and the second set of attribute-importance scores indicating importance of the asset-listing attributes to performance of asset listings.

16. One or more non-transitory computer-readable media storing one or more sequences of instructions that, when executed by one or more processors, cause the one or more processors to implement an asset-exchange feedback system for performing asset-exchange feedback operations, wherein the instructions cause:

collecting historical asset-listing data from an asset-exchange platform, the historical asset-listing data comprising, for each asset listing of a plurality of previous asset listings, a plurality of asset-listing attributes and a result of the asset listing;

using the collected historical asset-listing data, training a first machine learning model to output attribute-importance scores, wherein each attribute-importance score:
corresponds to a respective asset-listing attribute in the plurality of asset-listing attributes, and
indicates an importance of the respective asset-listing attribute to one or more offerees participating in the asset-exchange platform;

training a second machine learning model to categorize asset listings into one or more predefined categories based on the historical asset-listing data and a set of asset-listing attributes;

training a third machine learning model to predict asset-listing outcomes based on the historical asset-listing data and the set of asset-listing attributes;

after training the first machine learning model:
using the first machine learning model to output, based on a set of input attributes, a first set of attribute-importance scores, wherein each attribute-importance score in the first set of attribute-importance scores indicates an importance of the respective asset-listing attribute to a specified group of one or more offerees; and combining outputs of the first machine learning model, the second machine learning model, and the third machine learning model to generate feedback for optimizing the set of input attributes;

based on the first set of attribute-importance scores and the feedback generated from the combined outputs of the first, second, and third machine learning models, performing an asset-exchange feedback operation.

17. The one or more non-transitory computer-readable media of claim 16, wherein the result of the asset listing comprises a price at which the asset listing was executed, wherein the instructions further cause:

receiving a new asset listing having a set of asset-listing attributes; and using the first machine learning model to determine, based on the historical asset-listing data and the set of asset-listing attributes, a predicted price for the new asset listing,
wherein the asset-exchange feedback operation comprises submitting the new asset listing to the asset-exchange platform with the set of asset-listing attributes and the predicted price.

18. The one or more non-transitory computer-readable media of claim 16, wherein the instructions further cause:
receiving a new asset listing having a set of asset-listing attributes; and
using a second machine learning model to categorize the new asset listing, based on the historical asset-listing data and the set of asset-listing attributes, into a first category indicating that the new asset listing is predicted to be executed at a discount price or a second category indicating that the new asset listing is predicted to be executed at a premium price,
wherein the asset-exchange feedback operation comprises submitting the new asset listing to the asset-exchange platform with the set of asset-listing attributes and at a listing price according to results of the second machine learning model.

19. The one or more non-transitory computer-readable media of claim 16, wherein the result of the asset listing comprises a number of bids on the asset listing by the one or more offerees through the asset-exchange platform, wherein the instructions further cause:
receiving a new asset listing having a set of asset-listing attributes; and
using a third machine learning model to predict, based on the historical asset-listing data, the set of asset-listing attributes, and a selected listing price, a number of bids from the one or more offerees through the asset-exchange platform.

20. The one or more non-transitory computer-readable media of claim 16, wherein the historical asset-listing data further comprises, for each asset listing of the plurality of previous asset listings, performance data of the asset listing, wherein the instructions further cause:
using the first machine learning model to determine, based on the historical asset-listing data, a second set of attribute-importance scores, wherein each attribute-importance score in the second set of attribute-importance scores:
corresponds to a respective asset-listing attribute in the plurality of asset-listing attributes, and
indicates an importance of the respective asset-listing attribute to performance of the asset listing,
wherein the asset-exchange feedback operation comprises causing display of a comparison of the first set of attribute-importance scores indicating importance of the asset-listing attributes to one or more offerees participating in the asset-exchange platform and the second set of attribute-importance scores indicating importance of the asset-listing attributes to performance of asset listings.

* * * * *